(12) United States Patent
Lee et al.

(10) Patent No.: US 9,069,235 B2
(45) Date of Patent: Jun. 30, 2015

(54) DIGITAL PHOTOGRAPHING APPARATUS AND METHOD FOR CONTROLLING THEREOF

(75) Inventors: Kun-woo Lee, Suwon-si (KR);
Seung-han Lee, Suwon-si (KR);
Dong-min Ko, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 244 days.

(21) Appl. No.: 13/616,655

(22) Filed: Sep. 14, 2012

(65) Prior Publication Data
US 2013/0208176 A1 Aug. 15, 2013

(30) Foreign Application Priority Data
Feb. 13, 2012 (KR) ........................ 10-2012-0014401

(51) Int. Cl.
*H04N 5/232* (2006.01)
*G03B 13/36* (2006.01)
(52) U.S. Cl.
CPC ............ *G03B 13/36* (2013.01); *H04N 5/23212* (2013.01); *H04N 5/23258* (2013.01); *G03B 2217/005* (2013.01)
(58) Field of Classification Search
CPC .................................................. H04N 5/23212
USPC ...................................................... 348/345
See application file for complete search history.

(56) References Cited

U.S. PATENT DOCUMENTS

| | | | | |
|---|---|---|---|---|
| 5,873,006 | A | * | 2/1999 | Iwane .............................. 396/95 |
| 6,408,135 | B1 | * | 6/2002 | Imada ............................. 396/55 |
| 2008/0031609 | A1 | * | 2/2008 | Rukes .............................. 396/89 |
| 2014/0055629 | A1 | * | 2/2014 | Ochi et al. ................. 348/208.1 |

FOREIGN PATENT DOCUMENTS

| | | |
|---|---|---|
| JP | 2007-256480 A | 10/2007 |
| JP | 2009-009038 A | 1/2009 |
| JP | 2009009038 | * 1/2009 |

OTHER PUBLICATIONS

English translation of JP2009009038 Han et al Jan. 2009.*

* cited by examiner

*Primary Examiner* — James Hannett
(74) *Attorney, Agent, or Firm* — Drinker Biddle & Reath LLP (57) ABSTRACT

A digital photographing apparatus for performing an Auto Focusing (AF) function and a method for controlling thereof, the method including: measuring vibration degrees of the digital photographing apparatus; determining based on the measured vibration degrees whether a time is right before an AF operation is performed; if the time is right before the AF operation is performed, performing a preceding AF operation of determining a moving direction of a focus lens by moving the focus lens; and if a first shutter release button is pressed, performing a subsequent AF operation of moving the focus lens in the determined moving direction. Accordingly, an AF operation time (from after a user pushes a shutter) may be reduced by decreasing a moving distance of a focus lens and the number of direction changes by recognizing a behavior pattern of the user through vibration transition measured by a vibration detection sensor.

20 Claims, 8 Drawing Sheets

DIGITAL PHOTOGRAPHING APPARATUS AND METHOD FOR CONTROLLING THEREOF

CROSS-REFERENCE TO RELATED PATENT APPLICATION

This application claims the priority benefit of Korean Patent Application No. 10-2012-0014401, filed on Feb. 13, 2012, in the Korean Intellectual Property Office, which is incorporated herein in its entirety by reference.

BACKGROUND

1. Field

The invention relates to a digital photographing apparatus for performing an Auto Focusing (AF) function and a method for controlling thereof.

2. Description of the Related Art

Typical digital photographing apparatuses may generate an image file via a digital signal processor by performing image processing on an image input through an image pickup device and compressing the image-processed image and may store the generated image file in a memory.

In addition, the typical digital photographing apparatuses may display an image input through an image pickup device or an image of an image file stored in a memory on a display device.

Such digital photographing apparatuses perform an AF algorithm for finding a focal position while moving a focus lens within a predetermined range from an initial position to an infinite position during an AF operation.

SUMMARY

The invention provides a digital photographing apparatus with improved accuracy and speed of an Auto Focusing (AF) operation by recognizing a behavior pattern of a user through vibration transition measured by a vibration detection sensor and selectively changing an AF algorithm and a method for controlling thereof.

According to an aspect of the invention, there is provided a method for controlling of a digital photographing apparatus, the method including: measuring vibration degrees of the digital photographing apparatus; determining based on the measured vibration degrees whether a time is right before an AF operation is performed; if the time is right before the AF operation is performed, performing a preceding AF operation of determining a moving direction of a focus lens by moving the focus lens; and if a first shutter release button is pressed, performing a subsequent AF operation of moving the focus lens in the determined moving direction.

The method may further include capturing an image by an input of a second shutter release button if the subsequent AF operation of the focus lens ends.

The time right before the AF operation is performed may be a time right before the first shutter release button is pressed.

If the digital photographing apparatus is turned on and then the AF operation or an image-capturing operation is not performed for a predetermined time, if the AF operation or the image-capturing operation is performed and then is not performed again for the predetermined time and vibration occurs within a predetermined amplitude, or if vibration occurs within a predetermined amplitude for the predetermined time, it may be determined that the time is right before the AF operation is performed.

Each of the vibration degrees may be determined by a calculation value such as an average difference or a deviation between a maximum angular velocity and a minimum angular velocity, and may include vibration degrees in n axes including x, y, and z axes.

The preceding AF operation may be differently performed for a case where a time is right after the digital photographing apparatus is turned on or a case where the digital photographing apparatus maintains an ON state for a predetermined time.

If the time is right after the digital photographing apparatus is turned on and right before the AF operation is performed, a preceding AF operation of moving the focus lens by a predetermined distance in a direction away from the subject from a first direction may be performed.

If the first shutter release button is pressed, a subsequent AF operation of moving the focus lens in a subject direction from the moved position may be performed.

If the time is right before the AF operation is performed while the digital photographing apparatus maintains an ON state for a predetermined time, a preceding AF operation of measuring contrast values by moving the focus lens in both of left and right directions from a current position and then determining the moving direction as a direction having a higher contrast value may be performed.

If the first shutter release button is pressed, a subsequent AF operation of moving the focus lens in the determined direction having a higher contrast value may be performed.

According to another aspect of the invention, there is provided a digital photographing apparatus including: a vibration detection sensor for measuring vibration degrees of the digital photographing apparatus; a lens driver for moving a focus lens; and a digital signal processor for determining based on the measured vibration degrees whether a time is right before an AF operation is performed, and if the time is right before the AF operation is performed, controlling the lens driver to perform a preceding AF operation of determining a moving direction of a focus lens by moving the focus lens, and if a first shutter release button is pressed, controlling the lens driver to perform a subsequent AF operation of moving the focus lens in the determined moving direction.

The vibration detection sensor may determine each of the vibration degrees by a significant calculation value such as an average difference or a deviation between a maximum angular velocity and a minimum angular velocity, and each of the vibration degrees may include vibration degrees in n axes including x, y, and z axes.

The digital signal processor may capture an image if the subsequent AF operation of the focus lens ends and if an input of a second shutter release button is received.

The time right before the AF operation is performed may be a time right before the first shutter release button is pressed.

If the digital photographing apparatus is turned on and then the AF operation or an image-capturing operation is not performed for a predetermined time, if the AF operation or the image-capturing operation is performed and then is not performed again for the predetermined time and vibration occurs within a predetermined amplitude, or if vibration occurs within a predetermined amplitude for the predetermined time, the digital signal processor may determine that the time is right before the AF operation is performed.

The preceding AF operation may be differently performed for a case where it is after the digital photographing apparatus is turned on or a case where the digital photographing apparatus maintains an ON state for a predetermined time.

If a time is right after the digital photographing apparatus is turned on and right before the AF operation is performed, the digital signal processor may control the lens driver to perform a preceding AF operation of moving the focus lens by a predetermined distance in a direction away from the subject from a first direction.

If the first shutter release button is pressed, the digital signal processor may control the lens driver to perform a subsequent AF operation of moving the focus lens in a subject direction from the moved position.

If the time is right before the AF operation is performed while the digital photographing apparatus maintains an ON state for a predetermined time, the digital signal processor may control the lens driver to perform a preceding AF operation of measuring contrast values by moving the focus lens in both of left and right directions from a current position and then determining the moving direction as a direction having a higher contrast value.

If the first shutter release button is pressed, the digital signal processor may control the lens driver to perform a subsequent AF operation of moving the focus lens in the determined direction having a higher contrast value.

BRIEF DESCRIPTION OF THE DRAWINGS

The above and other features and advantages of the invention will become more apparent on review of detail exemplary embodiments thereof with reference to the attached drawings in which.

DETAILED DESCRIPTION

The invention may allow various kinds of change or modification and various changes in form, and specific embodiments will be illustrated in drawings and described in detail in the specification. However, it should be understood that the exemplary embodiments do not limit the invention to a specific disclosing form but include every modified, equivalent, or replaced one within the spirit and technical scope of the invention. In the following description, well-known functions or constructions are not described in detail because they would obscure the invention with unnecessary detail.

Although terms, such as 'first' and 'second', can be used to describe various elements, the elements cannot be limited by the terms. The terms can be used to distinguish a certain element from another element.

The terminology used in the application is used only to describe exemplary embodiments and does not have any intention to limit the invention. An expression in the singular includes an expression in the plural unless they are clearly different from each other in a context. In the application, it should be understood that terms, such as 'include' and 'have', are used to indicate the existence of implemented feature, number, step, operation, element, part, or a combination of them without excluding in advance the possibility of existence or addition of one or more other features, numbers, steps, operations, elements, parts, or combinations of them.

The invention can be represented with functional blocks and various processing steps. These functional blocks can be implemented by various numbers of hardware and/or software configurations for executing specific functions. For example, the invention may adopt direct circuit configurations, such as memory, processing, logic, and look-up table, for executing various functions under control of one or more processors or by other control devices. Like that the components of the invention can execute the various functions with software programming or software elements, the invention can be implemented by a programming or scripting language, such as C, C++, Java, or assembly language, with various algorithms implemented by a combination of a data structure, processes, routines, and/or other programming components. Functional aspects can be implemented with algorithms executed in one or more processors. In addition, the invention may adopt the prior art for electronic environment setup, signal processing and/or data processing. The terms, such as "mechanism", "element", "means", and "configuration", can be widely used and are not delimited as mechanical and physical configurations. The terms may include the meaning of a series of routines of software in association with a processor.

The invention will now be described more fully with reference to the accompanying drawings, in which exemplary embodiments of the invention are shown. Like reference numerals in the drawings denote like elements, and thus their repetitive description will be omitted.

Figure 1:
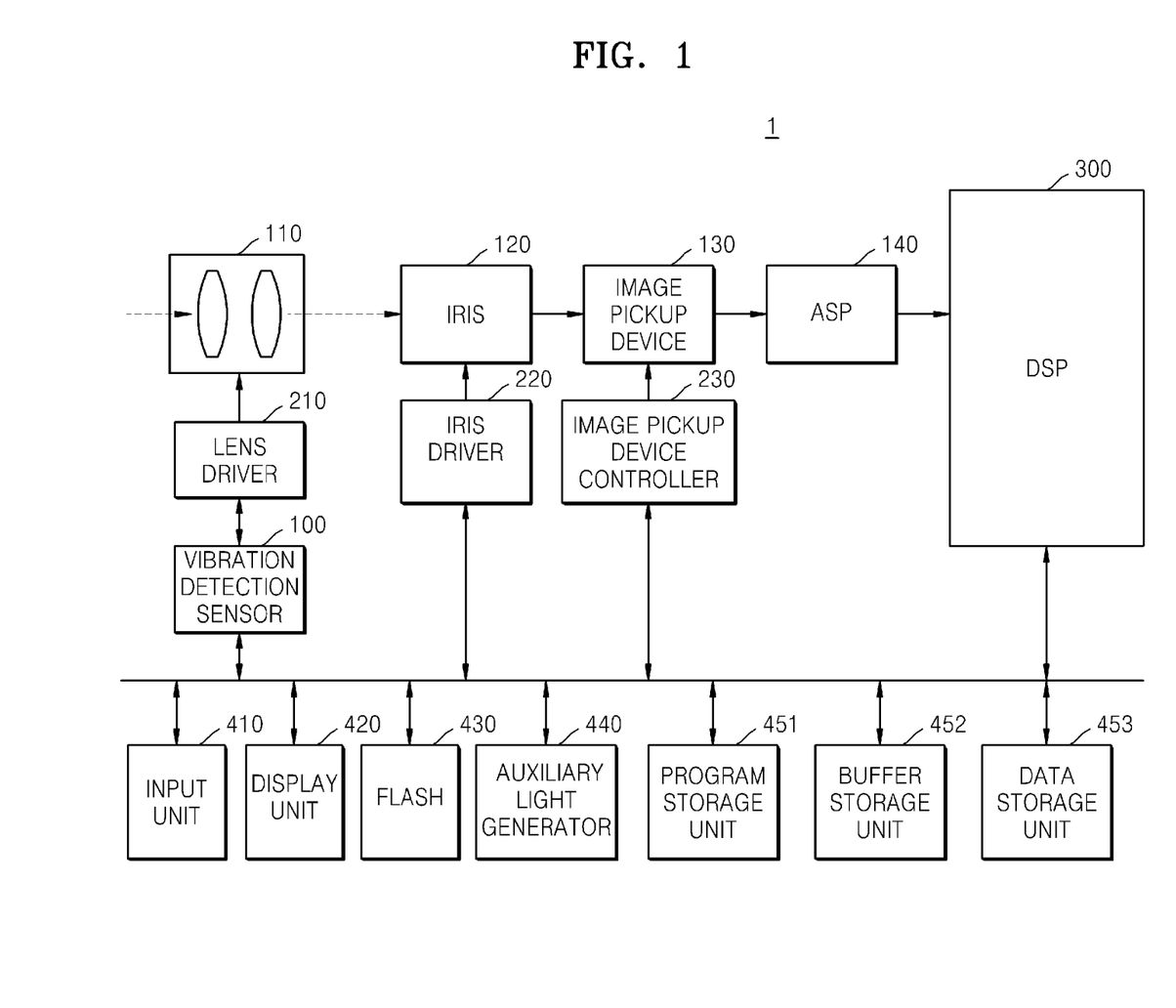
FIG. 1 is a block diagram of a digital camera as a digital photographing apparatus according to an embodiment of the invention.

FIG. 1 is a block diagram of a digital camera 1 as a digital photographing apparatus according to an embodiment of the invention. However, the digital photographing apparatus is not limited to the digital camera 1 shown in FIG. 1 and may be applied to digital devices such as compact digital cameras, single-lens reflex cameras, hybrid cameras having advantages of a compact digital camera and a single-lens reflex camera, camera phones, Personal Digital Assistants (PDAs), and Portable Multimedia Players (PMPs).

Referring to FIG. 1, the digital camera 1 may include a lens unit 110, a lens driver 210, an iris 120, an iris driver 220, an image pickup device 130, an image pickup device controller 230, an Analog Signal Processor (ASP) 140, a Digital Signal Processor (DSP) 300, an input unit 410, a display unit 420, a flash 430, an auxiliary light generator 440, a program storage unit 451, a buffer storage unit 452, a data storage unit 453, and a vibration detection sensor 100.

The lens unit 110 concentrates an optical signal. The lens unit 110 may include a zoom lens (not shown) for controlling narrowing or widening of an angle of view according to a focal length, and a focus lens 112 (see FIG. 2) for focusing a subject. Each of the zoom lens and the focus lens 112 may be formed by a single lens or a group of lenses.

The iris 120 adjusts the intensity of incident light by adjusting an open/close degree thereof.

The lens driver 210 and the iris driver 220 drive the lens unit 110 and the iris 120 in response to control signals from the DSP 300, respectively. The lens driver 210 may adjust a position of the focus lens 112 to perform an Auto Focusing (AF) operation and a focus changing operation, and perform a zoom changing operation by adjusting a position of the zoom lens. The lens driver 210 may be realized by a Voice Coil Motor (VCM), a piezo motor, or a stepper motor. For example, the lens driver 210 realized by a VCM may be assembled at a position around the lens unit 110 to move the lenses. The lens driver 210 may further include a motor driver (not shown) for driving the VCM, in addition to the VCM. The iris driver 220 perform operations, such as AF, Auto Exposure (AE) compensation, focus change, and subject depth adjustment, by adjusting an open/close degree of the iris 120, and in particular, adjusting an iris value (i.e., an F number).

The optical signal passing through the lens unit 110 forms an image of a subject on a light-reception face of the image pickup device 130. The image pickup device 130 may include a Charge-Coupled Device (CCD), a Complementary Metal Oxide Semiconductor Image Sensor (CIS), or a high-speed image sensor for converting the optical signal to an electric signal. The image pickup device 130 may adjust its sensitivity under control of the image pickup device controller 230. The image pickup device controller 230 may control the image pickup device 130 according to a control signal automatically generated by an image signal input in real-time or a control signal manually input by a manipulation of a user. The digital camera 1 may include a mechanical shutter (not shown) in which a cover moves upwards and downwards by a shutter (not shown).

The ASP 140 generates a digital image signal by performing noise reduction, gain adjustment, waveform standardization, and analog-to-digital conversion on an analog signal provided from the image pickup device 130.

The input unit 410 is a device via which a user inputs a control signal. The input unit 410 may include a shutter release button for opening and closing a shutter to expose the image pickup device 130 to light for a predetermined time, a power button for supplying power, a wide-angle zoom button and a telescopic zoom button for widening or narrowing an angle of view according to a corresponding input, character input keys, a mode selection button for selecting a mode such as a camera mode and a play mode, a white balance setting function selection button, and an exposure setting function selection button. The shutter release button may consist of first and second shutter release buttons. When the first shutter release button is pressed, the digital camera 1 performs a focusing operation and adjusts the intensity of light. Then, the user may press the second shutter release button, and accordingly, the digital camera 1 may capture an image. Although the input unit 410 includes various key buttons, the input unit 410 is not limited thereto and may be implemented in any user-input form, such as a keyboard, a touch pad, a touch screen, or a remote control.

The display unit 420 may include a Liquid Crystal Display (LCD), an organic luminescence display, or a Field Emission Display (FED) and displays state information of the digital camera 1 or a captured image.

The flash 430 is a device that brightens a subject by instantaneously emitting a bright light on the subject when the subject is photographed in a dark place, and a flash mode includes an automatic flash mode, a compulsive light emission mode, a light emission prohibition mode, a red-eye mode, and a slow synchro mode. The auxiliary light generator 440 provides auxiliary light to a subject so that the digital camera 1 can automatically focus on the subject quickly and correctly when the intensity of light is insufficient or when photographing is performed at night.

The digital camera 1 also includes the program storage unit 451 for storing programs such as an operation system for driving the digital camera 1 and applications, the buffer storage unit 452 for temporarily storing data required during a computation or result data, and the data storage unit 453 for storing image files including image signals and various kinds of information required by programs.

The digital camera 1 also includes the DSP 300 for processing the digital image signal input from the ASP 140 and controlling components of the digital camera 1 in response to external input signals. The DSP 300 may perform image signal processing for image quality enhancement of an input image signal, such as noise reduction, gamma correction, color filter array interpolation, color matrix, color correction, and color enhancement. In addition, the DSP 300 may generate an image file by compressing image data generated by performing the image signal processing for image quality enhancement. In addition, the DSP 300 may restore (decompress) image data from a generated image file. The compressed image file may be stored in the data storage unit 453. In addition, the DSP 300 may generate control signals for controlling a zoom change, a focus change, and AE compensation by executing programs stored in the program storage unit 451 and provide the generated control signals to the lens driver 210, the iris driver 220, and the image pickup device controller 230 to generally control the lens unit 110, the iris 120, and the image pickup device 130, respectively. According to an embodiment of the invention, the DSP 300 determines based on vibration degrees (i.e., an amount or extent of vibration) measured by the vibration detection sensor 100 whether a time is right before the AF operation is performed, and if the time is right before the AF operation is performed, controls the lens driver 210 to perform a preceding AF operation of determining a moving direction of the focus lens 112 by moving (driving) the focus lens 112, and if an input of the first shutter release button is received, controls the lens driver 210 to perform a subsequent AF operation of moving the focus lens 112 in the determined direction. To do this, the DSP 300 may include a determiner 310 (see FIG. 5), a preceding AF operation performing controller 320, and a subsequent AF operation performing controller 330. A detailed operation of the DSP 300 will be described in detail with reference to FIGS. 5 to 8.

The vibration detection sensor 100 detects a vibration of the digital camera 1. The vibration detection sensor 100 may be realized by a gyro sensor (not shown). The lens driver 210 may move the focus lens 112 in response to a vibration degree detected by the vibration detection sensor 100. That is, the lens driver 210 may mechanically compensate for a vibration of an image due to shaking by the hands. A detailed operation of the vibration detection sensor 100 will be described in detail with reference to FIGS. 5 to 8.

Figure 2:
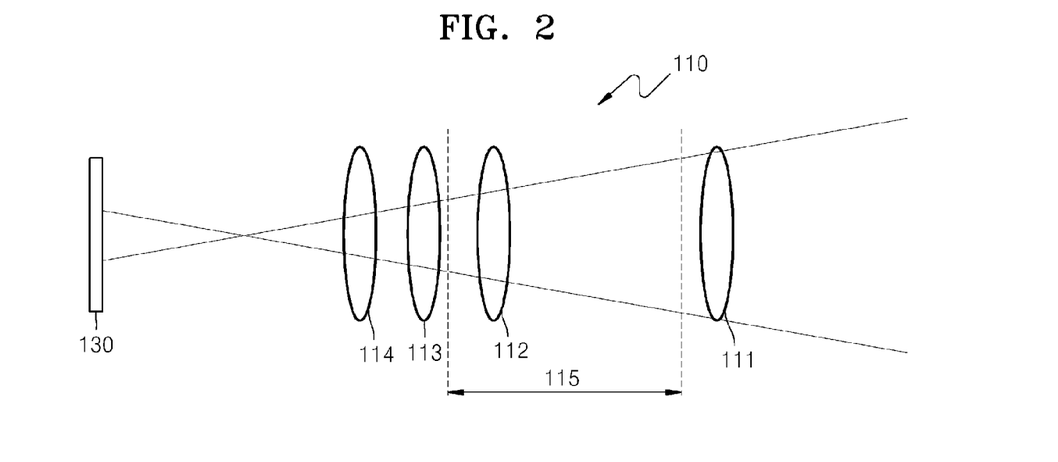
FIG. 2 is a detailed diagram of the lens unit in FIG. 1.

FIG. 2 is a detailed diagram of the lens unit 110 including a magnification lens 111 for adjusting a magnification of the zoom lens, the focus lens 112 for in-focus, a lens 113 for a vibration correction, and a lens 114 for other correction. An order and configuration of the lenses 111, 112, 113, and 114 may vary according to an optical design. The focus lens 112 focuses on a subject while being moved within a focus moving range 115 according to an optical design.

Figure 3:
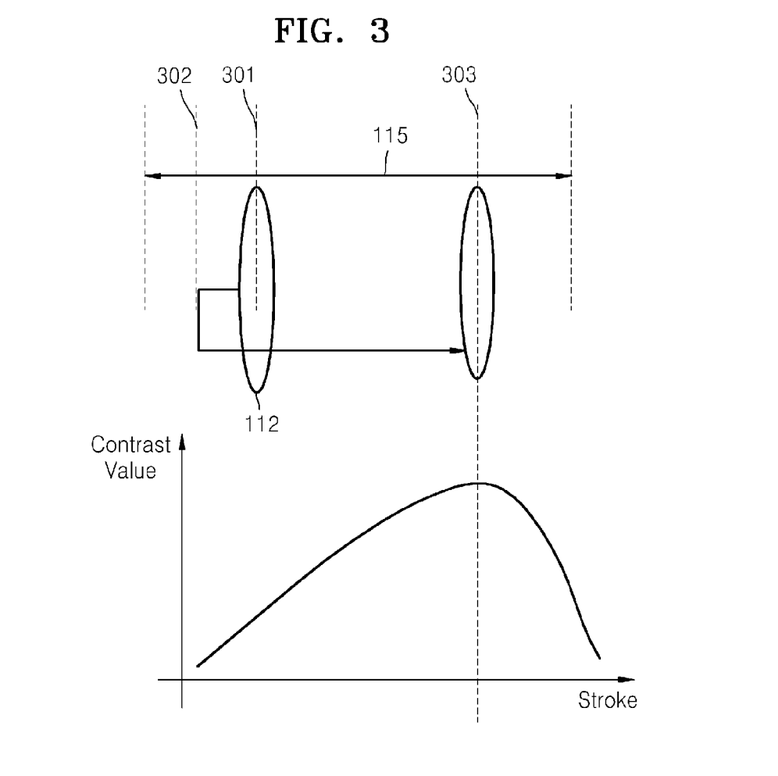
FIG. 3 is an illustrative diagram for describing movement of a focus lens during an AF operation, according to an embodiment of the invention.

FIG. 3 is an illustrative diagram for describing movement of the focus lens 112 during an AF operation, according to an embodiment of the invention. When the digital camera 1 is turned on, the focus lens 112 is moved to an infinite position 301 according to a general optical design. The infinite position 301 indicates a position of the focus lens 112 when a subject located as far as an infinite distance (not near but far from the digital camera 1 and the user) is in focus, and the focus lens 112 is usually located near the infinite position 301 by focusing on a landscape located at a far distance through the AF operation.

The general AF operation of the focus lens 112 when the digital camera 1 capable of the AF operation is turned on is described. When the user tries the AF operation under a condition where the focus lens 112 in the digital camera 1 using contrast AF is located at the infinite position 301, a subject is in focus while the focus lens 112 is being moved in a subject direction 303 within the focus moving range 115 after first moved to an over-infinite position (position in a direction away from the subject) 302. Why the focus lens 112 is previously moved to the over-infinite position 302 without being directly moved in the subject direction 303 is to prepare for a case where an in-focus position is near the infinite position 301. If the focus lens 112 is directly moved in the subject direction 303, a case where a subject is out of focus when an in-focus position is near the infinite position 301 may occur.

Due to this movement, since a moving distance of the focus lens 112 increases additionally (301→302 and 302→301) with two additional direction changes, a time required for the AF operation also increases.

Figure 4:
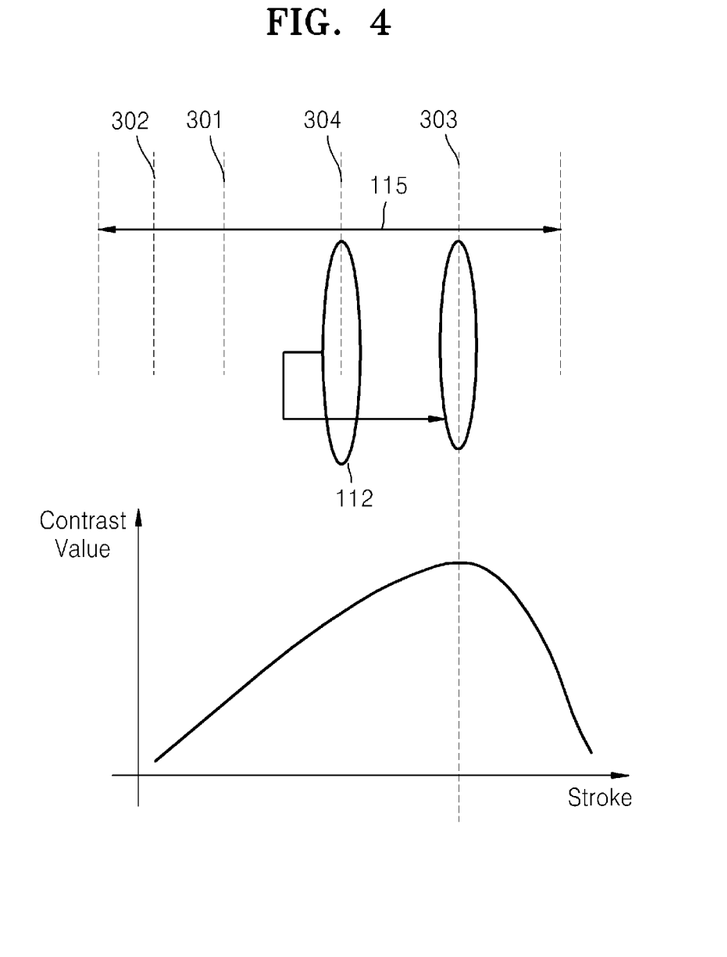
FIG. 4 is an illustrative diagram for describing movement of the focus lens during an auto focusing (AF) operation, according to another embodiment of the invention.

FIG. 4 is an illustrative diagram for describing movement of the focus lens 112 during the AF operation, according to another embodiment of the invention. When a predetermined time passes after the digital camera 1 is turned on, the focus lens 112 may be located at a predetermined position 304 within the focus moving range 115. At this time, if the user presses the shutter release button for the AF operation, the digital camera 1 searches for a higher-contrast direction 303 by moving the focus lens 112 from the current position 304 to the right and left and then moves the focus lens 112 in the higher-contrast direction 303. Due to this movement, since a moving distance of the focus lens 112 increases additionally with additional direction changes, a time required for the AF operation also increases in terms of control.

Figure 5:
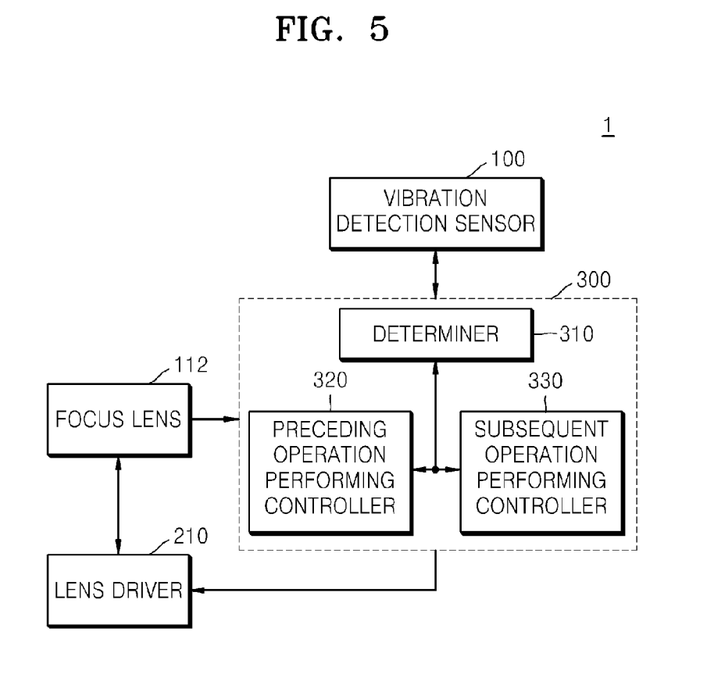
FIG. 5 is a detailed block diagram of the digital photographing apparatus in FIG. 1, in which representative components for changing an AF algorithm by vibration detection are shown.

FIG. 5 is a detailed block diagram of the digital photographing apparatus 1 in FIG. 1, in which representative components for changing an AF algorithm by vibration detection are shown. Referring to FIG. 5, the digital photographing apparatus 1 includes the vibration detection sensor 100, the focus lens 112, the lens driver 210, and the DSP 300. The DSP 300 includes the determiner 310, the preceding AF operation performing controller 320, and the subsequent AF operation performing controller 330.

The vibration detection sensor 100 detects a vibration degree of the digital camera 1, and the vibration degree may be the magnitude of an angular velocity value ANGVEL. The vibration degree may include vibration degrees in n axes including x, y, and z axes. That is, the vibration degree may be obtained by using an x-axis angular velocity value and a y-axis angular velocity value (ANGVEL x&y). The determiner 310 derives a maximum angular velocity value and a minimum angular velocity value from the detected vibration degree and compares the maximum angular velocity value and the minimum angular velocity value with a reference value.

Figure 6:
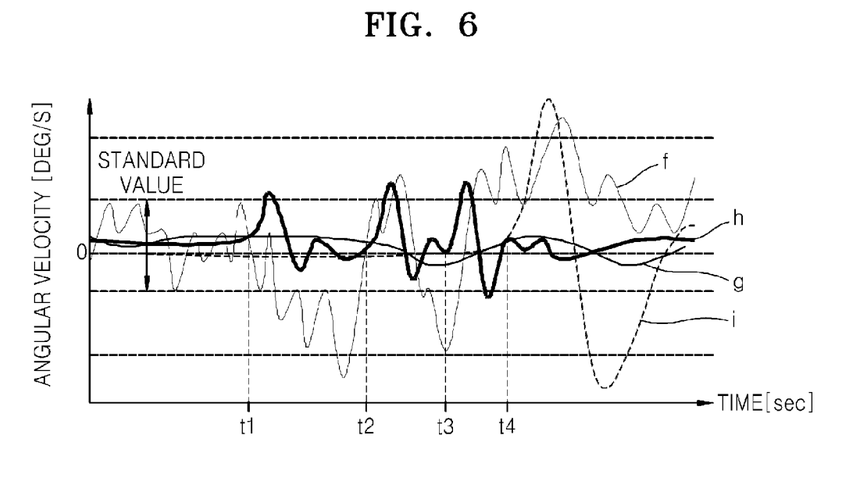
FIG. 6 is a graph illustrating angular velocity transition of the digital photographing apparatus in FIG. 1.

FIG. 6 is a graph illustrating angular velocity variation of the digital camera 1, where an x axis indicates time, and a y axis indicates an angular velocity value. In FIG. 6, angular velocity values are converted into a digital signal. In FIG. 6, four curves f, g, h, and i based on the time when their angular velocity values are 0 are shown. The curve f indicates an angular velocity value at the time when the user grips the digital camera 1. The curve f shows that the angular velocity value maintains a reference value range for a predetermined time t1 and then a variation range of the angular velocity value is very large as time passes. The curve g indicates an angular velocity value in a case where the digital camera 1 is fixed on a tripod. The curve h indicates an angular velocity value while photographing is performed by pressing the shutter release button of the digital camera 1 fixed on the tripod. The curve h shows that the angular velocity value maintains a reference value range for the predetermined time t1 and then a variation range of the angular velocity value is very large as time passes. The curve i indicates an angular velocity value when the user removes the digital camera 1 from the tripod.

The determiner 310 determines whether a time is right before the user performs the AF operation by determining vibration degrees represented as angular velocity values detected by the vibration detection sensor 100. The time right before the user performs the AF operation indicates a time right before the user presses the first shutter release button. That is, the time right before the user performs the AF operation represents a time at which a prediction can be made that the user is about ready to perform the AF operation. The determiner 310 derives a maximum angular velocity value and a minimum angular velocity value from each of the detected vibration degrees, compares the maximum angular velocity value and the minimum angular velocity value with a reference value, and if the maximum angular velocity value and the minimum angular velocity value are less than the reference value, determines that the time is right before the user performs the AF operation. The reference value is an index indicating that a time is right before the user performs the AF operation and indicates an amount of vibration within a predetermined amplitude for a predetermined time (e.g., t1 of FIG. 6) in a state where a sleep mode is released after the digital camera 1 is turned on. The reference value is preferably larger than an angular velocity value due to an internal vibration. The reference value may be set by the user or programmed and stored in the digital camera 1 during manufacturing.

Referring to the curve f of FIG. 6 in which the user grips the digital camera 1 to capture an image and the curve h of FIG. 6 in which photographing is performed by pressing the shutter release button of the digital camera 1 fixed on the tripod, the angular velocity value maintains a reference value range for the predetermined time t1 and then a variation range of the angular velocity value is very large as time passes. Thus, it may be determined that the time is right before the user performs the AF operation, by previously storing angular velocity values generated by learning the above cases in a database and comparing a received vibration degree with that in the database.

As such, if the digital camera 1 is turned on and then the AF operation or an image-capturing operation is not performed for the predetermined time t1, if the AF operation or the image-capturing operation is performed and then is not performed again for the predetermined time t1 and vibration occurs within a predetermined amplitude, or if vibration occurs within a predetermined amplitude the predetermined time t1, the determiner 310 determines that the time is right before the AF operation is performed.

As a determination result of the determiner 310, if the determiner 310 determines based on a vibration degree detected by the vibration detection sensor 100 that the time is right before the user performs the AF operation, the preceding AF operation performing controller 320 and the subsequent AF operation performing controller 330 sequentially control the lens driver 210 to move the focus lens 112. That is, the focus lens 112 performs a preceding AF operation and a subsequent AF operation. The preceding AF operation is an operation of moving the focus lens 112 to determine a moving direction and is performed before the first shutter release button is pressed. The subsequent AF operation is an operation of moving the focus lens 112 in the determined moving direction and is performed after the first shutter release button is pressed. In general, if the first shutter release button is pressed for in-focus, the preceding AF operation and the subsequent AF operation are performed together. However, in the current embodiment, if it is determined that the time is right before the user performs the AF operation, a processing time of the AF operation may be reduced by first performing the preceding AF operation and then performing the subsequent AF operation when the first shutter release button is pressed.

Figure 7A:
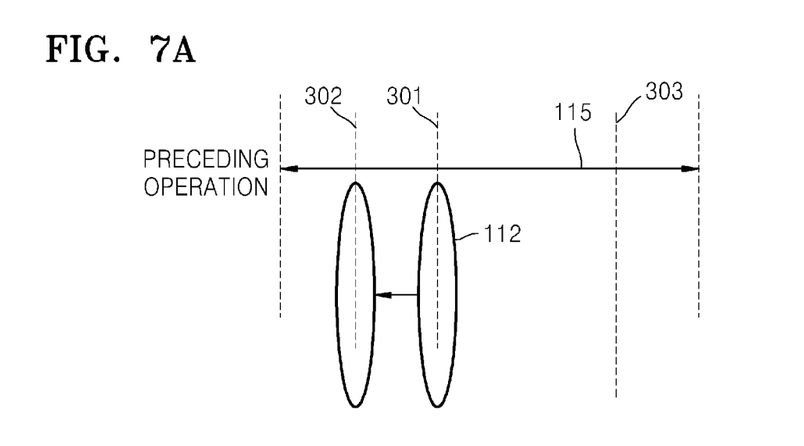
FIGS. 7A and 7B are illustrative diagrams for describing movement of the focus lens during the AF operation based on FIG. 5, according to an embodiment of the invention.
Figure 7B:
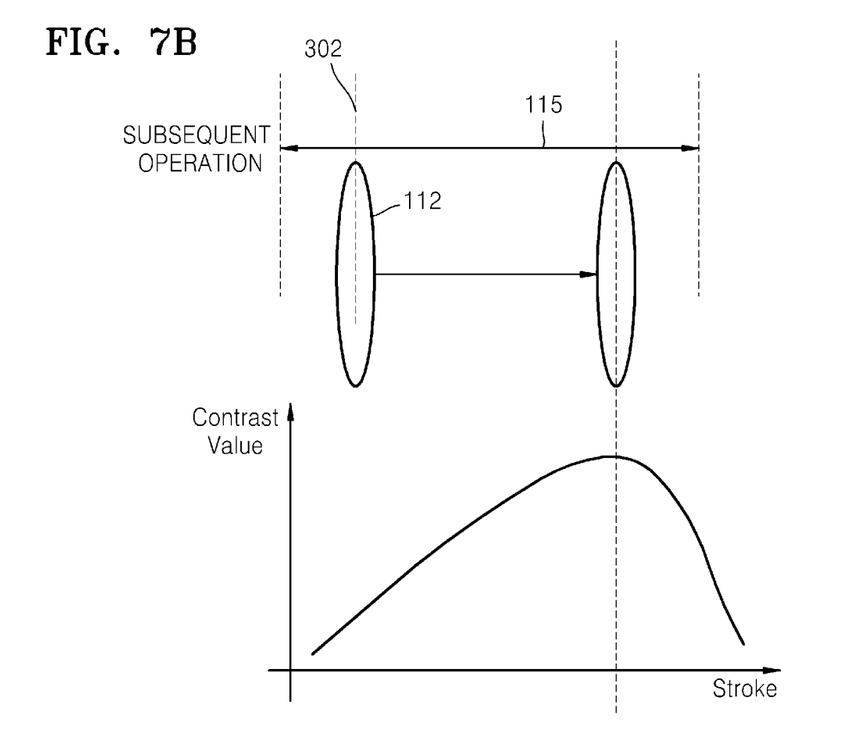

FIGS. 7A and 7B are illustrative diagrams for describing movement of the focus lens 112 during the AF operation right after the digital camera 1 is turned on, that is, before the focus lens 112 has been moved from the infinite position 301 due to a previous AF operation or the digital camera 1 has been turned on for a predetermined period of time. As a determination result of the determiner 310, if the determiner 310 determines that the time is right before the user performs the AF operation, the preceding AF operation performing controller 320 outputs a control signal to the lens driver 210 to perform a preceding AF operation, and the lens driver 210 moves the focus lens 112 in response to the control signal, as shown in FIG. 7A. The preceding AF operation indicates an operation of previously scanning to check whether an in-focus position of a subject exists near the infinite position 301 by moving the focus lens 112 from the infinite position 301 to the over-infinite position 302. A time required for the preceding AF operation is a short time of approximately 33 ms, and a moving distance of the focus lens 112 is a maximum of about 0.5 mm, which is a distance difficult for the user to perceive through the display unit 420 even though the preceding AF operation of the focus lens 112 is performed.

After the preceding AF operation is completed, if the user presses the first shutter release button, the subsequent AF operation performing controller 330 outputs a control signal to the lens driver 210 to perform a subsequent AF operation, and the lens driver 210 moves the focus lens 112 in response to the control signal, as shown in FIG. 7B. The subsequent AF operation indicates an operation of finding the in-focus position of the subject while moving the focus lens 112 from the over-infinite position 302 at the time the preceding AF operation is completed in the subject direction 303 without any direction change of the focus lens 112.

Due to this operation, a moving distance of the focus lens 112 may be substantially short (302→303) when the AF operation is performed, and a waiting time according to a direction change may be reduced, thereby reducing an AF time.

Figure 8A:
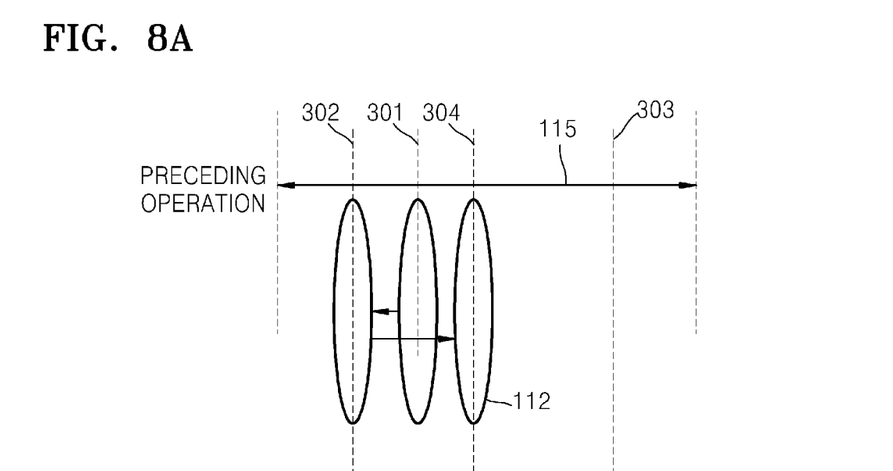
FIGS. 8A and 8B are illustrative diagrams for describing movement of the focus lens during the AF operation based on FIG. 5, according to another embodiment of the invention.
Figure 8B:
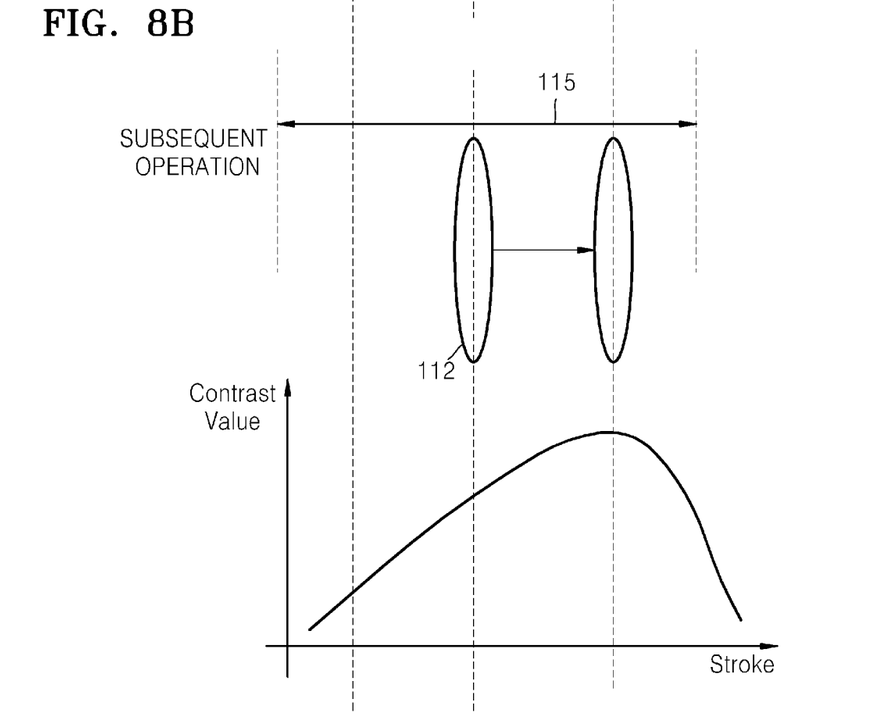

FIGS. 8A and 8B are illustrative diagrams for describing movement of the focus lens 112 during the AF operation in a case where a predetermined time passes after the digital camera 1 is turned on, that is, when a previous AF operation has moved the focus lens 112 from the infinite position 301 or the digital camera 1 has been turned on for a predetermined period of time. A state where the predetermined time passes after the digital camera 1 is turned on indicates that the predetermined time further passes than a time right after the digital camera 1 is turned on.

Likewise, as a determination result of the determiner 310, if the determiner 310 determines that the time is right before the user performs the AF operation, the preceding AF operation performing controller 320 outputs a control signal to the lens driver 210 to perform a preceding AF operation, and the lens driver 210 moves the focus lens 112 in response to the control signal, as shown in FIG. 8A. The preceding AF operation indicates an operation of moving the focus lens 112 from the predetermined position 301 to the left and right (302 and 304) and then determining a moving direction of the focus lens 112 in a higher-contrast direction 303 by receiving contrast values during the movement of the focus lens 112. A variation in distance according to the preceding AF operation is difficult for the user to perceive.

After the preceding AF operation is completed, if the user presses the first shutter release button, the subsequent AF operation performing controller 330 outputs a control signal to the lens driver 210 to perform a subsequent AF operation, and the lens driver 210 moves the focus lens 112 in response to the control signal, as shown in FIG. 8B. The subsequent AF operation indicates an operation of finding an in-focus position of a subject while moving the focus lens 112 in the higher-contrast direction 303 determined in the preceding AF operation.

Due to this operation, a moving distance of the focus lens 112 may be substantially short (304→303) when the AF operation is performed, and a waiting time according to a direction change may be reduced, thereby reducing an AF time.

As described above, if it is determined that the time is right before the user performs the AF operation, the DSP 300 performs a preceding AF operation, and if the user presses the first shutter release button, the DSP 300 performs a subsequent AF operation, thereby completing the AF operation. Thereafter, if the user presses the second shutter release button, the digital camera 1 captures an image for which the AF operation is completed.

Figure 9:
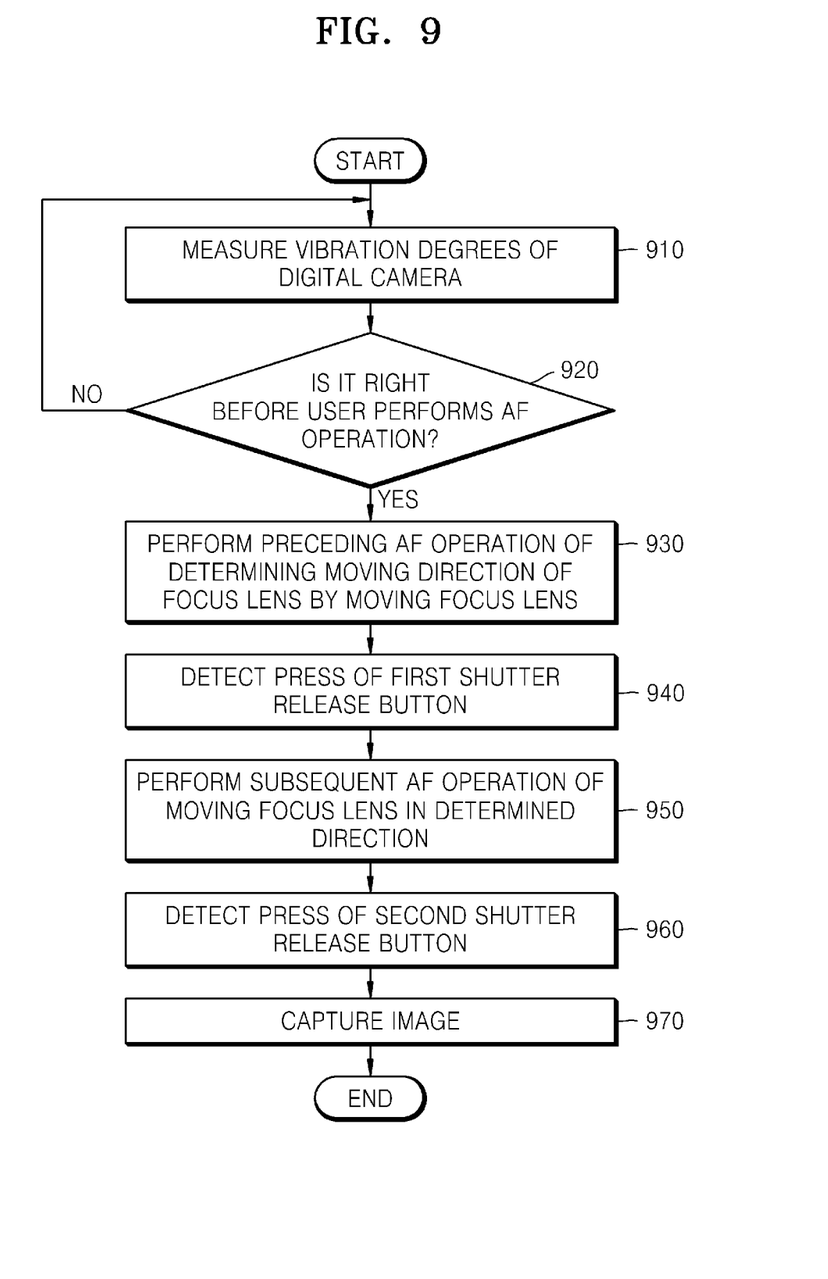
FIG. 9 is a flowchart illustrating a method of controlling the digital photographing apparatus, according to an embodiment of the invention.

FIG. 9 is a flowchart illustrating a method of controlling the digital photographing apparatus, according to an embodiment of the invention.

Referring to FIG. 9, in operation 910, the vibration detection sensor 100 detects a vibration degree of the digital camera 1 and outputs the detected vibration degree to the DSP 300.

The vibration degree may be the magnitude of an angular velocity value ANGVEL. The vibration degree may include vibration degrees in n axes including x, y, and z axes.

In operation 920, the DSP 300 determines based on the received vibration degree whether the time is right before the user performs the AF operation that is, whether the user is predicted to be about ready to perform the AF operation.

The time right before the user performs the AF operation indicates a time right before the user presses the first shutter release button. The DSP 300 derives a maximum angular velocity value and a minimum angular velocity value from each of the received vibration degrees, compares the maximum angular velocity value and the minimum angular velocity value with a reference value. If the digital photographing apparatus is turned on and then the AF operation or an image-capturing operation is not performed for a predetermined time, if the AF operation or the image-capturing operation is performed and then is not performed again for the predetermined time and vibration occurs within a predetermined amplitude, or if vibration occurs within a predetermined amplitude for the predetermined time, the DSP 300 may determine that the time is right before the user performs the AF operation. Since how to determine whether the time is right before the user performs the AF operation has been described above, a detailed description thereof is not repeated here.

If it is determined based on the vibration degrees that the time is right before the user performs the AF operation, the DSP 300 controls the lens driver 210 to perform a preceding AF operation of determining a moving direction of the focus lens 112 by moving the focus lens 112, and the lens driver 210 moves the focus lens 112 in response to a control signal in operation 930.

Figure 10:
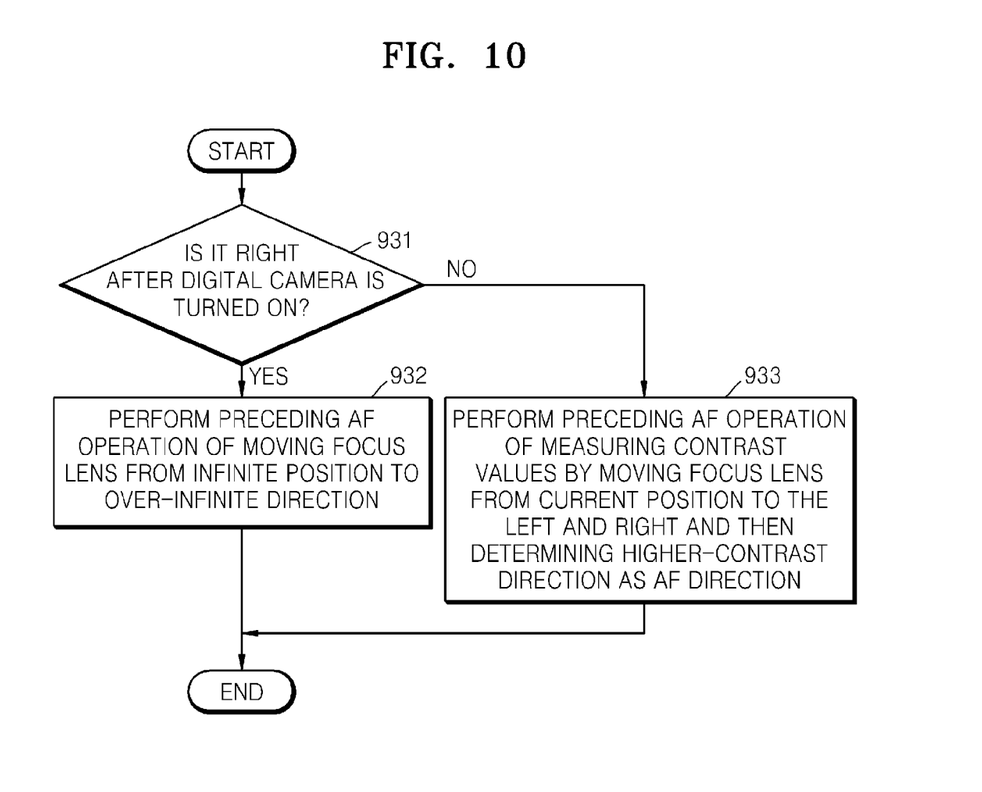
FIG. 10 is a flowchart illustrating a process of performing a preceding AF operation of the focus lens in FIG. 9.

FIG. 10 is a flowchart illustrating a process of performing the preceding AF operation of the focus lens 112. Referring to FIG. 10, in operation 931, the DSP 300 determines whether a time is right after the digital camera 1 is turned on. The preceding AF operation of the focus lens 112 is described by dividing it into a case where the time is right after the digital camera 1 is turned on and a case where a predetermined time further passes right after the digital camera 1 is turned on.

In the case where the time is right after the digital camera 1 is turned on, the DSP 300 controls the lens driver 210 to perform a preceding AF operation of previously scanning to check whether an in-focus position of a subject exists near the infinite position 301 by moving the focus lens 112 from the infinite position 301 to the over-infinite position 302, as shown in FIG. 7A, in operation 932. This preceding AF operation is difficult for the user to perceive through the display unit 420.

However, in the case where the time is not near when the digital camera 1 is turned on, the DSP 300 controls the lens driver 210 to perform a preceding AF operation of moving the focus lens 112 from the predetermined position 301 to the left and right (302 and 304) and then determines a moving direction of the focus lens 112 in the higher-contrast direction 303 by receiving contrast values during the movement of the focus lens 112, as shown in FIG. 8A, in operation 932. This preceding AF operation is difficult for the user to perceive through the display unit 420.

Referring back to FIG. 9, after the preceding AF operation is completed, the DSP 300 receives a first shutter release button input signal from the first shutter release button pressed by the user in operation 940.

When the first shutter release button input signal is received, the DSP 300 controls the lens driver 210 to perform a subsequent AF operation of moving the focus lens 112 in the determined direction, and the lens driver 210 moves the focus lens 112 in response to a control signal in operation 950.

In the case where the time is right after the digital camera 1 is turned on, the DSP 300 controls the lens driver 210 to perform a subsequent AF operation of finding the in-focus position of the subject while moving the focus lens 112 from the over-infinite position 302 at the time the preceding AF operation is completed in the subject direction 303 without any direction change of the focus lens 112, as shown in FIG. 7B. In the case where more time has passed since the digital camera 1 was turned on, the DSP 300 controls the lens driver 210 to perform a subsequent AF operation of finding the in-focus position of the subject while moving the focus lens 112 in the higher-contrast direction 303, as shown in FIG. 8B.

After the subsequent AF operation is completed, that is after the AF operation is completed, if the DSP 300 receives a second shutter release button input signal from the second shutter release button pressed by the user in operation 960, the DSP 300 captures an image for which the AF operation is completed in operation 970.

As described above, according to the embodiments of the invention, an AF operation time (from after a user pushes a shutter) may be reduced by decreasing a moving distance of a focus lens and the number of direction changes by recognizing a behaviour pattern of the user through vibration transition measured by a vibration detection sensor.

In addition, since an instant right before the user pushes the shutter may be perceived, an optimal AF performance may be shown by selectively changing an AF algorithm.

The invention can also be embodied as computer-readable codes on a non-transitory computer-readable recording medium. The computer-readable recording medium is any data storage device that can store data which can be thereafter read by a computer system.

Examples of the non-transitory computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion on multiple non-transitory computer-readable recording media. Also, functional programs, codes, and code segments for accomplishing the invention can be easily construed by programmers skilled in the art to which the invention pertains.

While the invention has been particularly shown and described with reference to exemplary embodiments thereof, it will be understood by those of ordinary skill in the art that various changes in form and details may be made therein without departing from the spirit and scope of the invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the invention.

All cited references including publicized documents, patent applications, and patents cited in the invention can be merged in the invention in the same manner as the shown by individually and concretely merging each cited reference and the shown by generally merging each cited reference in the invention.

What is claimed is:

1. A method for controlling of a digital photographing apparatus, the method comprising:
   measuring vibration degrees of the digital photographing apparatus;
   determining based on the measured vibration degrees whether a time is right before an auto focusing (AF) operation is performed;
   if the time is right before the AF operation is performed, performing a first preceding AF operation of always moving a focus lens by a predetermined distance away from a subject to determine a moving direction of the focus lens for a subsequent AF operation; and
   if a first shutter release button is pressed, performing the subsequent AF operation of moving the focus lens in the determined moving direction.

2. The method of claim 1, further comprising capturing an image by an input of a second shutter release button if the subsequent AF operation of the focus lens ends.

3. The method of claim 1, wherein the time right before the AF operation is performed is a time right before the first shutter release button is pressed.

4. The method of claim 1, wherein, if the digital photographing apparatus is turned on and then the AF operation or an image-capturing operation is not performed for a predetermined time, if the AF operation or the image-capturing operation is performed and then is not performed again for the predetermined time and vibration occurs within a predetermined amplitude, or if vibration occurs within a predetermined amplitude for the predetermined time, it is determined that the time is right before the AF operation is performed.

5. The method of claim 1, wherein each of the vibration degrees is determined by a calculation value such as an average difference or a deviation between a maximum angular velocity and a minimum angular velocity, and includes vibration degrees in n axes including x, y, and z axes.

6. The method of claim 1, wherein a second preceding AF operation is performed based on whether a time is right after the digital photographing apparatus is turned on or the digital photographing apparatus is maintained in an ON state for a predetermined time.

7. The method of claim 6, wherein, if the first shutter release button is pressed, a subsequent AF operation of moving the focus lens in a subject direction from the moved position is performed.

8. The method of claim 6, wherein, if a time is right after the digital photographing apparatus is turned on and right before the AF operation is performed, the position of the focus lens is maintained after the first preceding AF operation.

9. The method of claim 6, wherein, if the time is right before the AF operation is performed while the digital photographing apparatus is maintained in an ON state for a predetermined time, performing the second preceding AF operation of moving the focus lens in a direction toward the subject, measuring contrast values while performing the first and the second preceding AF operations, and then determining the moving direction as a direction having a higher contrast value.

10. The method of claim 9, wherein, if the first shutter release button is pressed, a subsequent AF operation of moving the focus lens in the determined direction having a higher contrast value is performed.

11. A digital photographing apparatus comprising:
a vibration detection sensor for measuring vibration degrees of the digital photographing apparatus;
a lens driver for moving a focus lens; and
a digital signal processor for determining based on the measured vibration degrees whether a time is right before an auto focusing (AF) operation is performed, and if the time is right before the AF operation is performed, controlling the lens driver to perform a first preceding AF operation of always moving the focus lens by a predetermined distance away from a subject to determine a moving direction of the focus lens for a subsequent AF operation, and if a first shutter release button is pressed, controlling the lens driver to perform the subsequent AF operation of moving the focus lens in the determined moving direction.

12. The digital photographing apparatus of claim 11, wherein the vibration detection sensor determines each of the vibration degrees by a significant calculation value such as an average difference or a deviation between a maximum angular velocity and a minimum angular velocity, and each of the vibration degrees includes vibration degrees in n axes including x, y, and z axes.

13. The digital photographing apparatus of claim 11, wherein the digital signal processor captures an image if the subsequent AF operation of the focus lens ends and if an input of a second shutter release button is received.

14. The digital photographing apparatus of claim 11, wherein the time right before the AF operation is performed may be a time right before the first shutter release button is pressed.

15. The digital photographing apparatus of claim 11, wherein, if the digital photographing apparatus is turned on and then the AF operation or an image-capturing operation is not performed for a predetermined time, if the AF operation or the image-capturing operation is performed and then is not performed again for the predetermined time and vibration occurs within a predetermined amplitude, or if vibration occurs within a predetermined amplitude for the predetermined time, the digital signal processor determines that the time is right before the AF operation is performed.

16. The digital photographing apparatus of claim 11, wherein a second preceding AF operation is performed based on whether a time is right after the digital photographing apparatus is turned on or a case where the digital photographing apparatus is maintained in an ON state for a predetermined time.

17. The digital photographing apparatus of claim 16, wherein, if a time is right after the digital photographing apparatus is turned on and right before the AF operation is performed, the digital signal processor controls the lens driver to maintain the position of the focus lens after the first preceding AF operation.

18. The digital photographing apparatus of claim 17, wherein, if the first shutter release button is pressed, the digital signal processor controls the lens driver to perform a subsequent AF operation of moving the focus lens in a subject direction from the moved position resulting from the first preceding AF operation.

19. The digital photographing apparatus of claim 16, wherein, if the time is right before the AF operation is performed while the digital photographing apparatus is maintained in an ON state for a predetermined time, the digital signal processor controls the lens driver to perform the second preceding AF operation of moving the focus lens in a direction toward the subject, measuring contrast values while performing the first and the second preceding AF operations, and then determining the moving direction as a direction having a higher contrast value.

20. The digital photographing apparatus of claim 19, wherein, if the first shutter release button is pressed, the digital signal processor controls the lens driver to perform a subsequent AF operation of moving the focus lens in the determined direction having a higher contrast value.

* * * * *